March 14, 1950      E. A. WILHELM      2,500,888
PRESSURE RELIEF VALVE
Filed Nov. 6, 1943
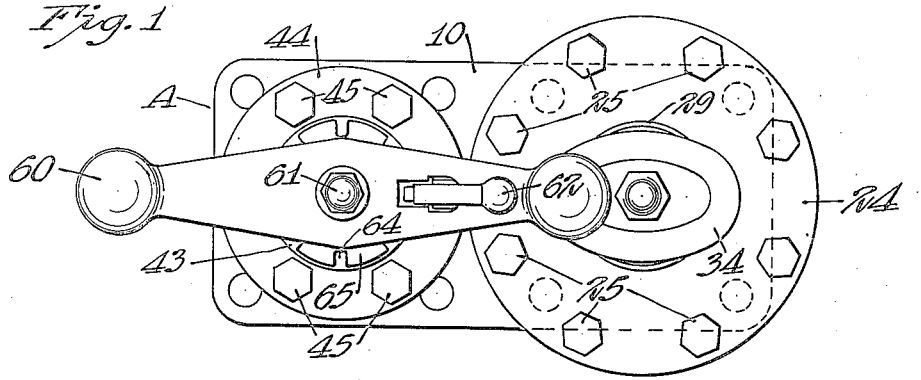
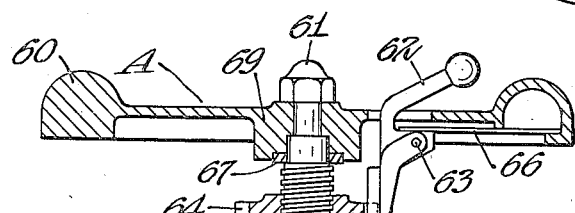
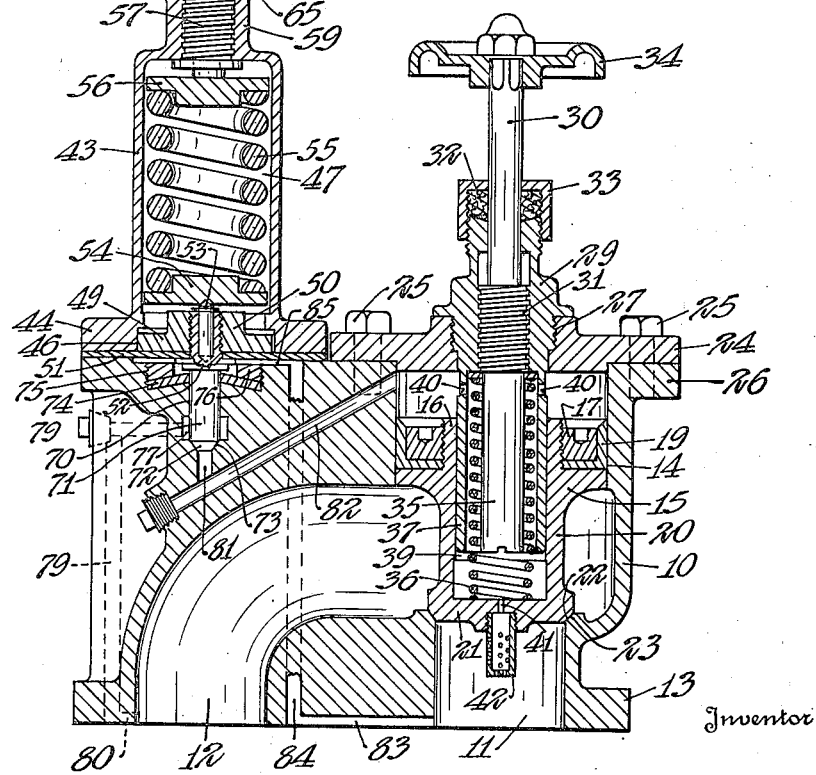
Inventor
Edward A. Wilhelm
By Robert M. Dunning
Attorney Patented Mar. 14, 1950

2,500,888

UNITED STATES PATENT OFFICE 2,500,888

PRESSURE RELIEF VALVE

Edward A. Wilhelm, St. Paul, Minn., assignor to Waterous Company, St. Paul, Minn., a corporation of Minnesota Application November 6, 1943, Serial No. 509,243

4 Claims. (Cl. 137—53)

My invention relates to an improvement in pressure relief valves, wherein it is desired to provide a valve construction which may be used to automatically relieve an excess of pressure.

In pumping systems, conditions sometimes arise wherein the outlet line of the pump is stopped at least temporarily, the pump then creating a tremendous pressure in the outlet line. In order to alleviate an otherwise dangerous condition, a relief valve is ordinarily employed operable under abnormal pressure to by-pass fluid from the pump outlet back to the pump inlet or to the exhaust. In order to function properly under various conditions it is desirable to have the relief valve operable at a predetermined pressure which is variable. Under some conditions it may be found desirable to by-pass fluid when a relatively low abnormal pressure is experienced. Under other conditions, such as when the back pressure on the pump is relatively high, it is desirable to have the valve operate at a relatively high abnormal pressure. Means must therefore be provided for adjusting this release pressure.

An object of the present invention lies in the provision of a pressure relief valve which operates automatically to relieve fluid pressure when a predetermined abnormal pressure is experienced.

A further feature of the present invention lies in the fact that my valve may be rendered inoperable for use as a relief valve when it is so desired. Accordingly when it is found desirable to definitely seal the exhaust passage, this result may be accomplished.

A further feature of the present invention resides in the provision of a sealing means for definitely sealing the valve casing, should leakage through the pressure relief portion of the valve mechanism take place. The spring chamber of the pressure relief valve mechanism is ordinarily sealed from contact with fluid. However, should this seal be broken for any reason and permit leakage to occur into this spring chamber the sole exhaust opening from this spring chamber may be effectively sealed.

A further feature of the present invention lies in the provision of a pressure relief valve which incorporates a valve normally closed by fluid pressure and a spring closed member. When the spring closed member is opened due to an abnormal pressure, the fluid pressure on opposite sides of the fluid actuated valve becomes unbalanced, permitting the fluid actuated valve to open. Thus, in effect the spring actuated valve acts as a pilot valve for the fluid operated valve.

These and other objects and novel features of my invention will be more clearly and fully set forth in the following specification and claims.

In the drawings forming a part of my specification:

Figure 1 is a top plan view of the valve showing my new construction.

Figure 2 is a vertical section centrally through the valve illustrated in Figure 1.

The valve A comprises a valve body or casing 10 having an inlet passage 11 thereto and an outlet passage 12 therefrom. The inlet passage 11 is preferably connected to the discharge of a fluid pressure device, such as a fluid pressure pump. The outlet 12 may be connected to the inlet of the pump or to the exhaust. The body 10 is provided with an attaching flange 13 by means of which the body 10 may be attached to suitable inlet and outlet manifolds communicating with the inlet and outlet passages 11 and 12, respectively.

The valve body 10 is provided with a cylinder 14 which is concentric with the inlet 11. A piston 15 is slidable within the cylinder 14. The piston 15 is provided with an integral threaded sleeve 16, to which is threaded a packing nut 17. The packing nut 17 clamps the angularly shaped packing or gasket 19 between the nut 17 and the piston 15. The packing or gasket 19 is arranged to form a seal against the cylindrical walls and is formed of any suitable material, such as leather.

A sleeve 20 is integral with the piston 15 and extends downwardly therefrom. The sleeve 20 is provided with a closed end 21 externally provided with a tapered valve portion 22. The body 10 is provided at the mouth of the inlet 11 with a valve seat 23 engageable with the tapered valve portion 22 to form a closure for fluid in the inlet 11.

A cylinder end plate 24 is secured by suitable means, such as the bolts 25, to the circular flange 26 at the top of the cylinder 14. This end closure plate 24 is provided with an axial aperture therethrough which is internally threaded at 27. A valve stem guide bushing 29 is provided with external threads for engagement with the threads 27 of the end plate 24. This bushing 29 acts as a guide for the valve stem 30 which may move vertically therethrough.

The valve stem 30 is provided with threads 31 thereupon which engage internal threads on the interior of the bushing 29. The upper end of the valve stem 30 extends through a packing gland 32 equipped with a suitable packing nut 33, and the stem 30 may be actuated by the handle or operating disk 34 secured to the upper end of the stem.

The valve stem 30 is provided with an extension 35 extending substantially beyond the threads 31. This extension is arranged to engage against the lower extremity 21 of the piston 15 when it is desired to manually hold the valve portion 22 of the piston against its valve seat 23. Obviously, when the valve stem 30 is rotated until the extension 35 engages the lower closing end of the piston 15, this piston will be unaffected by any increase in pressure. A spring 36 encircles the valve stem extension 35 and impinges against the lower closed end 21 of the piston 15 so as to normally urge this piston 15 into valve closing position with the valve portion 22 in engagement with its seat 23.

In order to guide the piston 15, I provide a sleeve 37 integral with and depending from the bushing 29, and slidable within the hollow cylindrical inner surface 39 of the piston 15. Apertures 40 at the upper extremity of this sleeve 37 are provided to communicate fluid pressure to the end of the piston 15 opposite the closed end 21. The relatively small aperture 41 is provided in the closed end 21 of the piston, and this aperture 41 is protected by a perforated enclosure 42 from the direct action or velocity pressure of fluid entering the inlet 11.

As illustrated in Figure 2 of the drawings, the inlet 11 extends into the valve body from the lower end of the body. The outlet 12 extends at substantially right angles to the inlet 11 and then turns parallel to the inlet 11. These details of construction, while advantageous in certain respects, are not essential construction.

On the surface of the valve body 10 opposite the surface containing the inlet and outlet, I provide a substantially hollow parallel cylindrical enclosure 43 which is provided with an attachment flange 44 at one end thereof designed to be bolted by cap screws 45, or the like, to the valve body 10. A cylindrical recess 46 of slightly larger diameter than the diameter of the bore 47 of the hollow cylindrical enclosure 43 accommodates a vertically movable disk 49 provided with an upwardly extending boss 50. A diaphragm 51 clamped between the flange 44 and the body 10 is secured to the disc 49 by means of a hollow cap screw 52. The head of the cap screw 52 is on one side of the diaphragm 51, while the disk 49 lies on the other side thereof, and the cap screw extends through the diaphragm and is threaded into the disk. A pointed pin 53 is mounted in the hollow cap screw 52 and acts to support a pressure plate 54. The pressure plate 54 is urged against the pin 53 by means of a spring 55 which extends between the pressure plate 54 and a second pressure plate 56. The position of the pressure plate 56 is adjusted by means of a threaded shank 57 which extends through the internally threaded boss 59 on the top of the cylindrical enclosure 43.

The shank 57 is rotated by means of a double ended arm 60 secured to the shank 57 intermediate its ends by any suitable means, such as by the nut 61. A locking lever 62 is pivotally mounted at 63 to the arm 60, and this locking lever is urged into engagement with any one of a series of angularly spaced notches 64 in a cylindrical flange 65. A locking lever 62 is urged into engagement with a selected notch by means of a flat spring 66 secured to the lever or arm 60.

A gasket or sealing washer of packing material 67 is recessed into the lower surface of the hub 69 of the locking arm or lever 60. This packing or gasket is arranged to seat against the upper extremity of the boss 59 when the arm 60 has threaded the shank 57 into its lowermost position. As a result should any leakage occur to permit fluid to enter the enclosure 43, this enclosure may be definitely sealed by threading the shank 57 downwardly until the washer or packing 67 engages the upper end of the boss 59. This provision is essentially an emergency provision to be used in case the diaphragm 51, or some other portion of the spring apparatus becomes injured.

An axial recess 70 is provided in the valve body 10 coaxial with the enclosure 43. The cap screw 52 is provided with an extension 71 arranged to fit into the axial bore 70. The lower extremity of this extension 71 is provided with a tapered valve portion 72 arranged to seat against a tapered seat 73 in the valve body.

In order to prevent leakage about the slidable extension or valve rod 71, I provide a packing ring 74 at the base of a relatively large diameter aperture 75 beneath the diaphragm 51 and coaxial with the bore 70. A packing nut 76 is provided in this aperture to hold the packing ring 74 in place. The valve rod or extension 71 slides through this packing ring in its operation.

A circular groove 77 encircles the valve stem 71 above the tapered portion 72 thereof, and this groove is connected by a right angular passage 79 to a groove 80 in the lower surface of the valve body 10 communicating with the outlet 12. Below the valve seat 73 a passage 81 communicates with an inclined passage 82 through the valve body so that the lower end of the valve rod 71 is subjected to the same pressure as the interior of the cylinder 14 above the piston 15. The passage 81 is larger than the port 41 so that fluid pressure above piston 15 may be relieved more quickly than it can be built up when the valve rod 71 is open.

The operation of my valve is relatively simple. The inlet 11 is connected with a source of fluid pressure and the outlet 12 is connected either to the exhaust or to the inlet of the fluid pressure creating apparatus. The arm 60 is adjusted to provide the proper tension upon the spring 55 and this arm 60 is locked in set position by means of the locking lever 62 for its engagement into one of the notches 64 in the flange 65. The pressure at which the valve will open is regulated by the pressure of the spring 55, and as the spring 55 is compressed more pressure is required to operate the valve.

Fluid pressure from the source of supply passes through the perforated enclosure 42, through the axial passage 41, and into the hollow interior of the piston 15. This fluid pressure is communicated in the ring-shaped space between the extension 35 and the sleeve 37, or in the space partially occupied by the spring 36. At the upper end of the sleeve 37 the fluid pressure may flow through the passages 40 and into the upper end of the cylinder 14 above the piston 15.

The piston 15 is urged into closed position by the spring 36, while pressure from beneath this piston against the closed end 21 thereof tends to raise the piston. After such fluid pressure has passed through the interior of the piston 15 to the space above the piston, the pressure on opposite ends of the piston will be equalized. However, because of the larger area above the piston, this fluid pressure will force the valve piston 15 into closed position seating the tapered valve surface 22 against its seat 23.

Fluid pressure is also transmitted through the passages 82 and 81 to the lower extremity of the valve rod or extension 71. However, as the tapered valve surface 72 thereof is in contact with its tapered seat 73, this pressure is trapped from communicating further and the valve rod 71 is elevated.

A passage 83 communicates with the inlet 11 and also communicates with a second passage 84 extending upwardly through the body of the valve. The upper extremity of the passage 84 is communicated through a transverse passage 85 to the space immediately below the diaphragm 51. Thus the downward pressure of the spring 55 is opposed by fluid pressure in the area beneath the diaphragm 51, which tends to compress the spring 55.

When an abnormal fluid pressure is experienced in the inlet 11, this pressure will be communicated to the area beneath the diaphragm 51, which pressure will be sufficient to contract the spring 55 and to elevate the valve rod 71. As a result of this action fluid pressure may flow from above the piston 15 through the passages 82 and 81 to the groove 77 which communicates with exhaust pressure through the passage 79. Therefore the fluid pressure above the piston 15 is released upon raising of the valve rod 71, and the forces acting upon the piston 15 are unequalized in the opposite direction. The pressure against the closed end 21 thereof is greater than the exhaust pressure in the chamber above the piston 15. As a result the piston 15 is free to rise against the compression of the spring 36, permitting some of the fluid from the intake 11 to flow into the outlet 12.

If the piston 15 is to be held closed so as to render the regulating mechanism inactive, the shank 30 may be screwed down until the extension 35 contacts the inner surface of the closed lower end 21, thus holding the valve in closed position.

If the diaphragm 51 should become ruptured, allowing a leakage of fluid into the enclosure 43, the only path of escape for this fluid is about the screw threads 57. Accordingly leakage may be avoided by rotating the arm 60 until the packing washer 67 engages the upper surface of the boss 59, thus sealing any possible leak in the case of emergency.

In accordance with the patent statutes, I have described the principles of construction and operation of my valve, and while I have endeavored to set forth the best embodiment thereof, I desire to have it understood that obvious changes may be made within the scope of the following claims without departing from the spirit of my invention.

I claim:

1. A valve comprising a valve body having an inlet and an outlet, a cylinder above said inlet and outlet, a valve member reciprocably mounted in said valve body and engageable in said inlet to normally close the same, said valve member having an end forming a piston in said cylinder, a hollow socket in said valve member, a tubular valve guide slidably engaging in said socket, said valve guide limiting the opening movement of said valve member, a reciprocable valve stem within said valve guide engageable with said valve member to manually hold said valve member in closed position, said valve stem projecting from said valve body, said valve member having small pressure equalizing passages therethrough and an operating member on the projecting portion of said stem.

2. A valve comprising a valve body having an inlet and an outlet, a cylinder above said inlet and outlet, a valve member reciprocably mounted in said valve body and engageable in said inlet to normally close the same, said valve member having an end forming a piston in said cylinder, a hollow socket in said valve member, a tubular valve guide slidably engaging in said socket, said valve guide limiting the opening movement of said valve member, a reciprocable valve stem within said valve guide engageable with said valve member to manually hold said valve member in closed position, said valve stem projecting from said valve body, an operating member on the projecting portion of said stem, said valve member having small pressure equalizing passages therethrough and spring means between said valve stem and said valve guide urging said valve member normally closed.

3. A valve comprising a valve body having an an inlet and an outlet, a cylinder above said inlet and outlet, a valve member reciprocably mounted in said valve body and engageable in said inlet to normally close the same, said valve member having an end forming a piston in said cylinder, a hollow socket in said valve member, a tubular valve guide slidably engaging in said socket, said valve guide limiting the opening movement of said valve member, a reciprocable valve stem within said valve guide engageable with said valve member to manually hold said valve member in closed position, said valve stem projecting from said valve body, said valve member having small pressure equalizing passages therethrough, an operating member on the projecting portion of said stem, means cooperable between said valve stem and said valve body to move said valve stem longitudinally upon rotation thereof, and packing means interposed between said valve stem and said valve body.

4. A valve comprising a valve body having an inlet and an outlet, a cylinder above said inlet and outlet, a valve member reciprocably mounted in said valve body and engageable in said inlet to normally close the same, said valve member having an end forming a piston in said cylinder, a hollow socket in said valve member, a sleeve extending into said socket to guide the same, said sleeve being threadably connected to said valve body, a reciprocable valve stem threadably engaged in said sleeve, an end of said valve stem being engageable with said valve member to manually hold said valve member in closed position, said valve stem projecting from said valve body, said valve member having small pressure equalizing passages therethrough an operating member on the projecting portion of said stem, and spring means interposed between said valve stem and said sleeve to urge said valve into closed position.

EDWARD A. WILHELM.

(References on following page)

REFERENCES CITED

The following references are of record in the file of this patent:

UNITED STATES PATENTS

| Number | Name | Date |
|---|---|---|
| 231,214 | Curtis | Aug. 17, 1880 |
| 398,841 | Mayer | Mar. 5, 1889 |
| 696,074 | Osmer | Mar. 25, 1902 |
| 867,651 | Frishmuth | Oct. 8, 1907 |
| 869,524 | Schutte | Oct. 29, 1907 |
| 1,101,933 | Hough | June 30, 1914 |
| 1,209,145 | Grabill | Dec. 29, 1916 |
| 1,447,546 | Greve | Mar. 6, 1923 |
| 1,804,060 | Morrill | May 5, 1931 |
| 1,957,567 | Williams | May 8, 1934 |
| 2,043,453 | Vickers | June 9, 1936 |
| 2,256,365 | Wentworth | Sept. 16, 1941 |
| 2,274,663 | Brisbane | Mar. 3, 1942 |
| 2,284,615 | Kligman | May 26, 1942 |

FOREIGN PATENTS

| Number | Country | Date |
|---|---|---|
| 114,378 | Germany | Oct. 15, 1900 |